US012152752B2

(12) United States Patent
Yao

(10) Patent No.: US 12,152,752 B2
(45) Date of Patent: Nov. 26, 2024

(54) AUTOMOTIVE LIGHT-EMITTING DIODE (LED) HEADLIGHT STRUCTURE

(71) Applicant: Foshang Heguang Electronics Co., LTD, Foshan (CN)

(72) Inventor: Shengjian Yao, Foshan (CN)

(73) Assignee: Foshang Heguang Electronics Co., LTD, Foshan (CN)

(*) Notice: Subject to any disclaimer, the term of this patent is extended or adjusted under 35 U.S.C. 154(b) by 0 days.

(21) Appl. No.: 18/424,879

(22) Filed: Jan. 29, 2024

(65) Prior Publication Data

US 2024/0344682 A1 Oct. 17, 2024

Related U.S. Application Data

(63) Continuation of application No. PCT/CN2023/098859, filed on Jun. 7, 2023.

(30) Foreign Application Priority Data

Apr. 17, 2023 (CN) ........................ 202320852584.X

(51) Int. Cl.

| | |
|---|---|
| ***F21S 45/47*** | (2018.01) |
| ***F21S 41/153*** | (2018.01) |
| ***F21S 45/43*** | (2018.01) |

(52) U.S. Cl.

CPC ............ *F21S 45/43* (2018.01); *F21S 41/153* (2018.01); *F21S 45/47* (2018.01)

(58) Field of Classification Search

CPC ................................ F21S 41/153; F21S 45/47

See application file for complete search history.

(56) References Cited

U.S. PATENT DOCUMENTS

| | | | | |
|---|---|---|---|---|
| 9,909,752 | B2 * | 3/2018 | Elwell | F21S 45/47 |
| 10,415,787 | B2 * | 9/2019 | Lessard | F21S 45/43 |

(Continued)

FOREIGN PATENT DOCUMENTS

| | | | |
|---|---|---|---|
| CA | 3131212 | A1 | 3/2023 |
| CN | 107740993 | A | 2/2018 |

(Continued)

OTHER PUBLICATIONS

English translation of Fang CN-112377872-A (Year: 2021).*
English translation of Xu CN-218001371-U (Year: 2022).*

*Primary Examiner* — Evan P Dzierzynski

(74) *Attorney, Agent, or Firm* — Bayramoglu Law Offices LLC

(57) ABSTRACT

An automotive light-emitting diode (LED) headlight structure includes a housing, where one end of the housing is provided with a straight section corresponding to lamp beads on a substrate; a middle part of the housing is provided with a heat dissipation slot; a heat sink for heat conduction is provided in the heat dissipation slot; one end of the housing connected to an adapter has a diameter greater than diameters at the middle part and the other end of the housing, and is provided therein with a cooling fan; and the adapter is provided with a ventilation hole for allowing the cooling air generated by the cooling fan to dissipate heat from all components in sequence. The automotive LED headlight structure greatly improves the utilization and heat dissipation efficiency of the cooling air, and appropriately reduces the volume of the heat sink and the cooling fan.

18 Claims, 11 Drawing Sheets

(56) References Cited

U.S. PATENT DOCUMENTS

2018/0045391 A1* 2/2018 Kuo ...................... F21S 41/192
2019/0360681 A1* 11/2019 Zhou ..................... F21V 29/503

FOREIGN PATENT DOCUMENTS

| | | | | |
|---|---|---|---|---|
| CN | 107965734 | A | | 4/2018 |
| CN | 112377872 | A | * | 2/2021 |
| CN | 215336126 | U | | 12/2021 |
| CN | 216143682 | U | | 3/2022 |
| CN | 216814044 | U | | 6/2022 |
| CN | 218001371 | U | * | 12/2022 |

* cited by examiner

AUTOMOTIVE LIGHT-EMITTING DIODE (LED) HEADLIGHT STRUCTURE

CROSS REFERENCE TO THE RELATED APPLICATIONS

This application is the continuation application of International Application No. PCT/CN2023/098859, filed on Jun. 7, 2023, which is based upon and claims priority to Chinese Patent Application No. 202320852584.X, filed on Apr. 17, 2023, the entire contents of which are incorporated herein by reference.

TECHNICAL FIELD

The present disclosure relates to a light, and in particular to an automotive light-emitting diode (LED) headlight structure.

BACKGROUND

With the continuous development of light-emitting diode (LED) technology and automotive systems, more and more vehicles use LED lights to replace traditional xenon lights. An existing automotive LED headlight includes a front housing and a rear housing. The front housing is provided with a copper substrate and lamp beads provided on the copper substrate. The rear housing is provided with cooling fins, a cooling fan, and a driving system. The lamp beads is heated to generate a large amount of heat, which is transferred to the copper substrate and the cooling fins. The cooling fan blows air to the cooling fins so as to dissipate the heat. Compared with traditional xenon lights, the automotive LED headlight has advantages such as stable operation, energy conservation, and environmental friendliness. However, the automotive LED headlight has a large volume, which is not suitable for vehicles with limited space, and it may be difficult to turn an LED headlight after the adapter of an automotive electrical system is connected. Moreover, the driving system of the automotive LED headlight is provided externally, which increases the volume of the automotive LED headlight and requires additional wiring to connect the cooling fan, restricting space and wiring layouts and affecting the aesthetics of the headlight. In addition, the cooling fan mainly acts on the cooling fins without acting on other parts, resulting in limited heat dissipation efficiency.

SUMMARY

An objective of the present disclosure is to provide a small-sized automotive light-emitting diode (LED) headlight structure. The automotive LED headlight structure of the present disclosure has high applicability, high heat dissipation efficiency, and high operational safety, thereby meeting the usage needs of various vehicle models.

The automotive LED headlight structure includes a housing, a substrate provided inside the housing and provided with lamp beads, and a heat sink and a rotatable cooling fan for conducting heat, where a chamber is provided in the housing, and the cooling fan is provided in the chamber; an outer wall of the housing is provided with a heat dissipation slot between the cooling fan and the lamp beads; and the heat sink is provided in the heat dissipation slot and in contact with the substrate.

Further, the housing includes a lamp bead section, a heat dissipation section and a connecting section that are sequentially arranged; the cooling fan is provided in the connecting section; the heat dissipation slot is provided in the heat dissipation section; and the lamp bead section is straight and provided with a hole for exposing the lamp beads.

Further, a diameter of an inner wall of the connecting section is greater than a diameter of an inner wall of the heat dissipation section.

Further, an inner wall of an end of the heat dissipation section facing away from the lamp beads is provided with a fan mounting slot; a fan mounting plate is fixedly provided in the fan mounting slot; and a rotating shaft of the cooling fan is provided on the fan mounting plate.

Further, a notch is provided at a side of the heat dissipation slot in the housing facing the lamp beads.

Further, the heat sink includes a heat dissipation bottom plate in contact with the substrate and a plurality of cooling fins vertically arranged on an outer side of the heat dissipation bottom plate; and the outer side of the heat dissipation bottom plate is provided on a plane where a bottom surface of the notch of the heat dissipation slot is located or at a side of the plane facing the substrate.

Further, an end of the housing facing away from the lamp beads is provided with an adapter for connecting an automotive system; a side of the adapter facing the lamp beads is provided with an opening and an inwardly recessed storage chamber; a circuit board is fixedly provided in the storage chamber; and an end of the substrate extends into the storage chamber and is connected to the circuit board.

Further, the substrate is provided with an avoidance hole corresponding to the cooling fan and allowing the cooling fan to pass through.

Further, the adapter is provided with a ventilation hole communicated with the storage chamber.

Further, an air outlet of the cooling fan faces the heat sink.

In the automotive LED headlight structure of the present disclosure, the cooling fan and the substrate provided with the lamp beads are provided inside the housing. The housing is provided with a hole corresponding to and exposing the lamp beads. The heat sink for heat conduction is provided in the heat dissipation slot on the outer wall of the housing and is in contact with the substrate to ensure heat conduction. When the automotive LED headlight is working, the adapter is driven by the automotive system to drive the lamp beads and the cooling fan to work through the circuit board, and the lamp beads emits a large amount of heat. A portion of the heat is retained at the lamp beads, while a portion the heat is conducted to the substrate and then to the heat sink. A small amount of the heat will also be conducted to the housing, causing the components to heat up to varying degrees. The cooling fan rotates to form cooling air. The cooling air flows from the adapter to cool the circuit board and then blows to the internal space of the housing, the substrate and the heat sink. A portion of the cooling air continues to blow the end of the substrate and the lamp beads from the internal space of the housing, and a portion of the cooling air blows from the heat dissipation slot in the housing and the notch thereof to the lamp beads. In this way, all the components are cooled. The automotive LED headlight structure has the following beneficial effects. The automotive LED headlight structure greatly improves the utilization and heat dissipation efficiency of the cooling air, and can appropriately reduce the volume of the heat sink and the cooling fan, thereby accommodating the cooling fan inside the housing. Compared to traditional automotive LED headlights provided outside the end of the housing, the present disclosure greatly reduces the volume of the entire automotive LED headlight. In addition, the heat sink of traditional automotive LED headlights is provided outside the end of the housing, where there is housing mounting port. The mounting space of the housing mounting port is extremely limited, which is a key factor that makes it difficult to mount the traditional automotive LED headlight. In the automotive LED headlight structure of the present disclosure, the heat sink is provided between the cooling fan and the lamp beads and provided at a further inside position of the housing mounting port. This location provides a larger mounting space and will not block the light generated by the lamp beads. Therefore, by improving the position of the heat sink, the automotive LED headlight structure of the present disclosure achieves a compact design, effectively utilizing the mounting space inside the housing, reducing the end volume of the automotive LED headlight, and leaving more mounting space for the adapter of the automotive circuit system. Therefore, the automotive LED headlight structure of the present disclosure can effectively meet the usage needs of various vehicle models and has wide applicability.

DETAILED DESCRIPTION OF THE EMBODIMENTS

Figure 1:
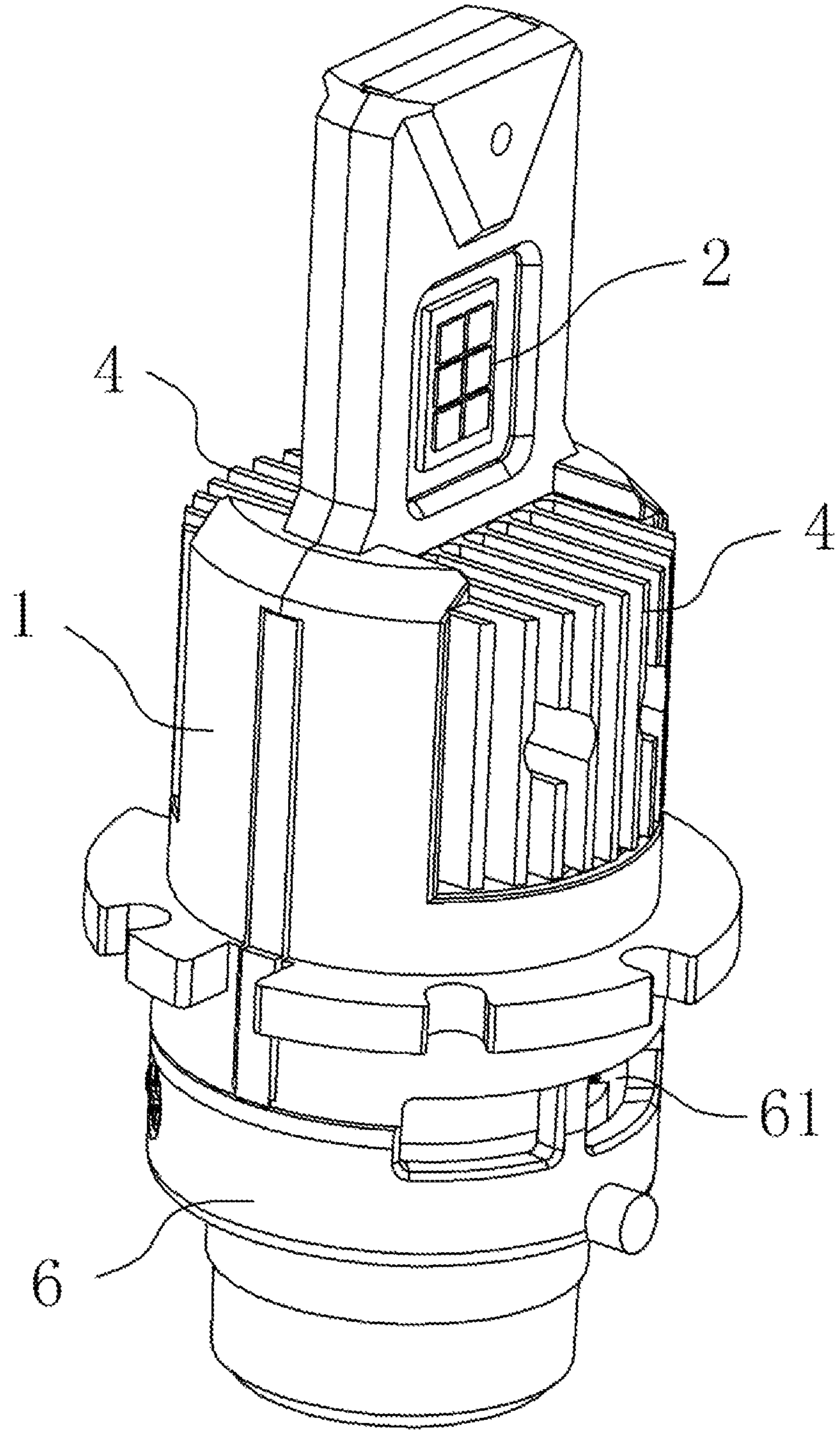
FIG. 1 is a structural diagram of an automotive LED headlight structure.
Figure 2:
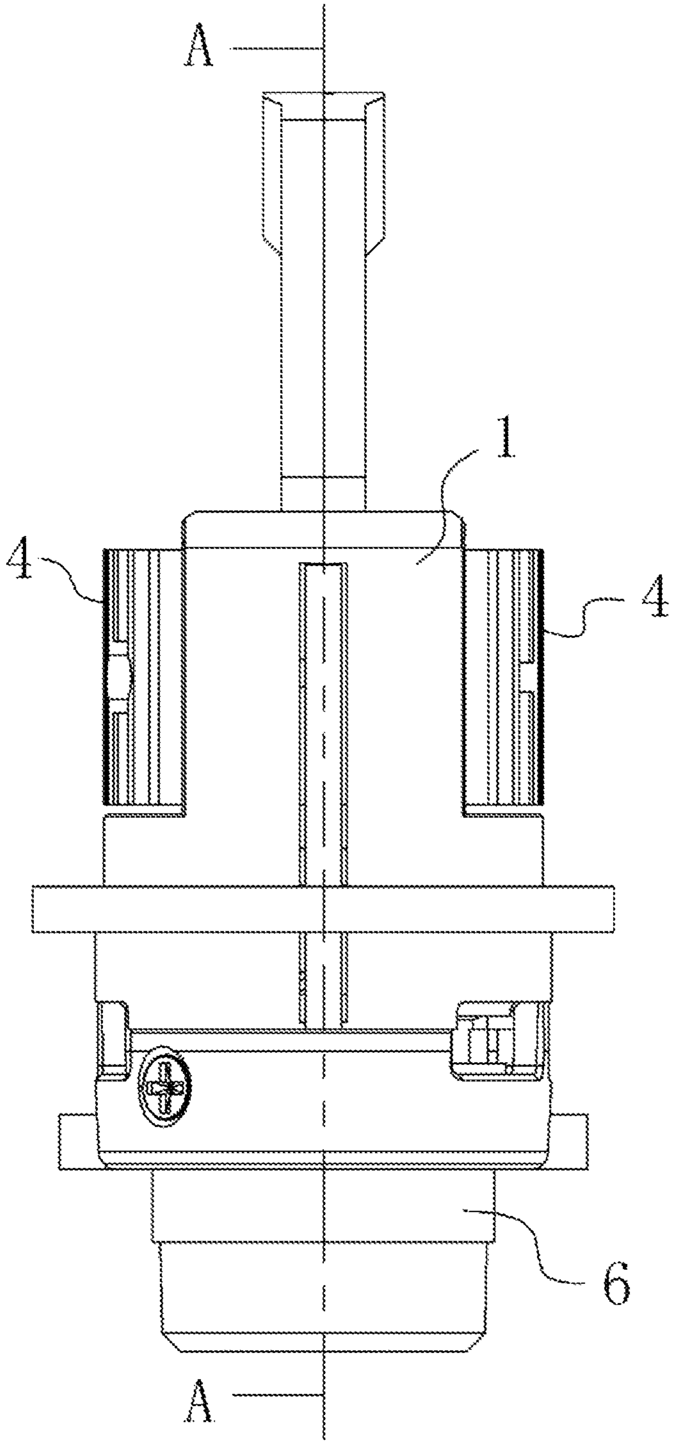
FIG. 2 is a lateral view of the automotive LED headlight structure shown in FIG. 1.

The following clearly and completely describes the technical solutions in the embodiments of the present disclosure with reference to drawings. Apparently, the described examples are merely some rather than all of the embodiments of the present disclosure. All other embodiments obtained by those of ordinary skill in the art based on the embodiments of the present disclosure without creative efforts shall fall within the protection scope of the present disclosure.

It should be noted that all the directional indications (such as upper, lower, left, right, front, back, top, bottom, inner, outer, vertical, transverse, longitudinal, anticlockwise, clockwise, circumferential, radial, and axial) in the embodiments of the present disclosure are merely used to explain a relative position relationship or motion situations of the components in a specific gesture (as shown in the figures). If the specific gesture changes, the directivity indication also changes accordingly.

Moreover, the terms such as "first" and "second" described in the embodiments of the present disclosure are used only for the purpose of description and are not intended to indicate or imply relative importance, or implicitly indicate the number of the indicated technical features. Therefore, features defined by "first" and "second" may explicitly or implicitly include at least one of the features. Further, the technical solutions of the various embodiments may be combined together on the basis that the combination is implementable by those of ordinary skill in the art. In case a combination of the technical solutions is contradictory or infeasible, such a combination is deemed inexistent and not falling within the protection scope of the present disclosure.

The present disclosure proposes an automotive light-emitting diode (LED) headlight structure.

In an embodiment of the present disclosure, the automotive LED headlight structure includes housing 1, a substrate 3 provided inside the housing and provided with lamp beads 2, and heat sink 4 and rotatable cooling fan 5 for conducting heat. Chamber 11 is provided in the housing, and the cooling fan is provided in the chamber. An outer wall of the housing is provided with heat dissipation slot 12 between the cooling fan and the lamp beads. The heat sink is provided in the heat dissipation slot and in contact with the substrate.

Figure 6:
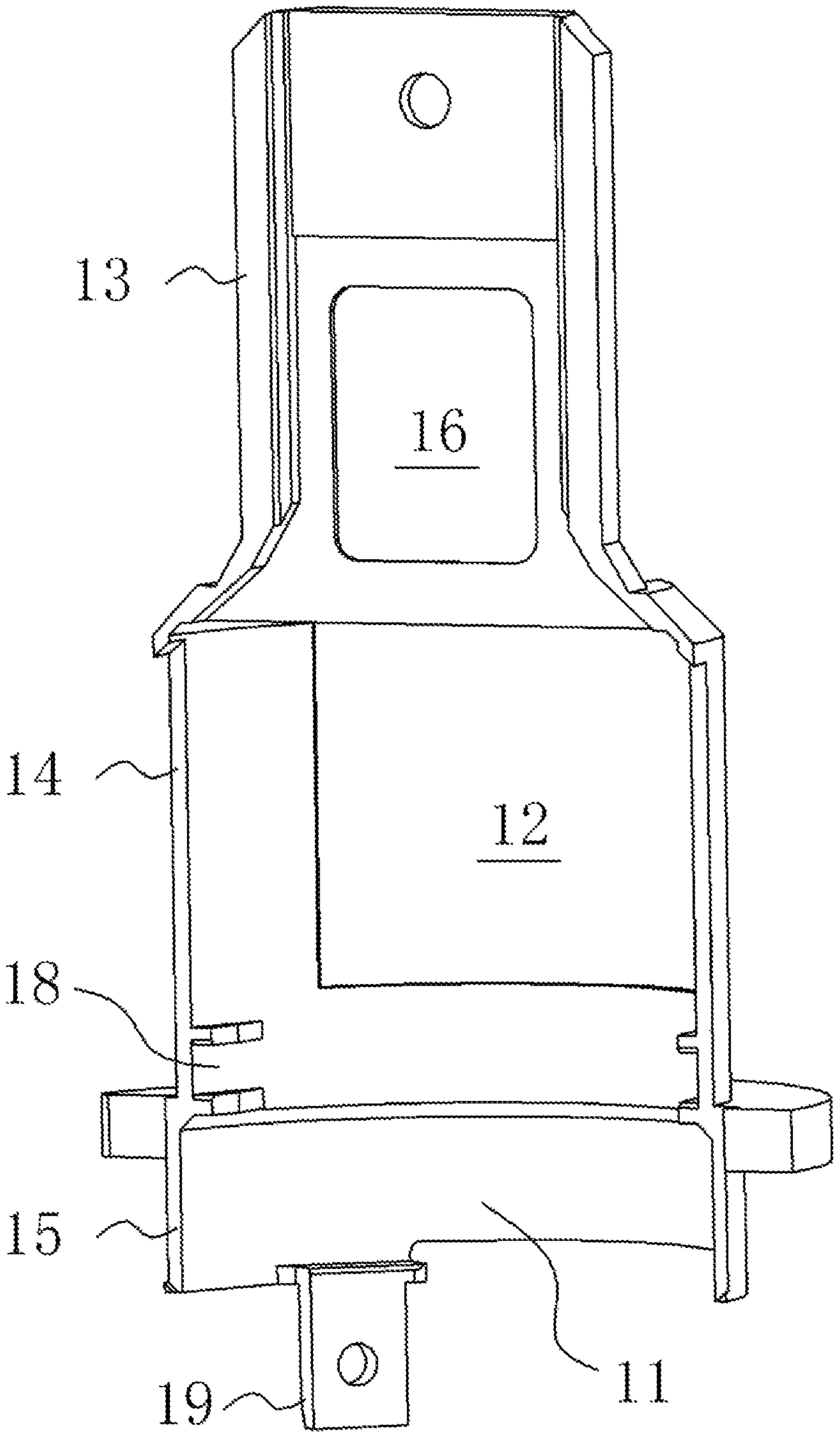
FIGS. 6 and 7 are respectively internal and external diagrams of the housing part.
Figure 7:
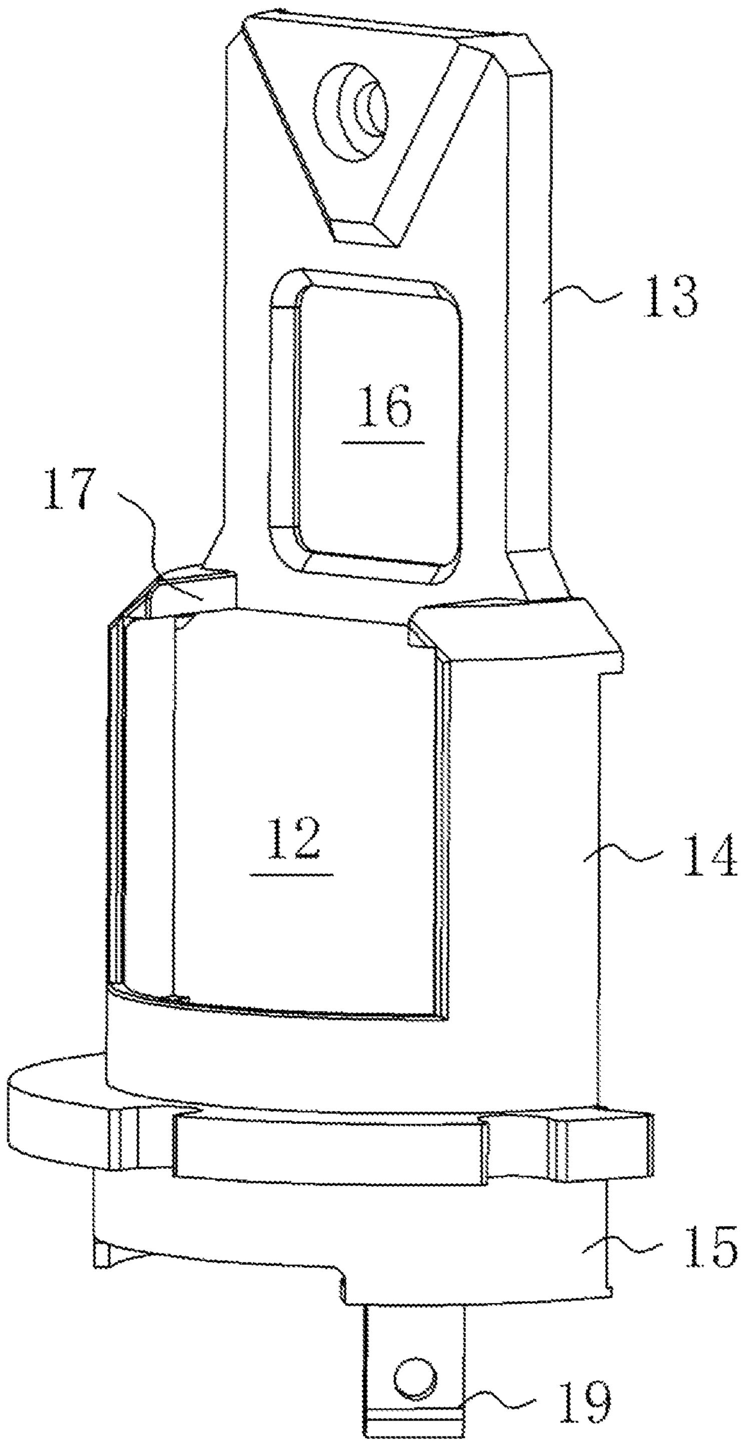
Figure 8:
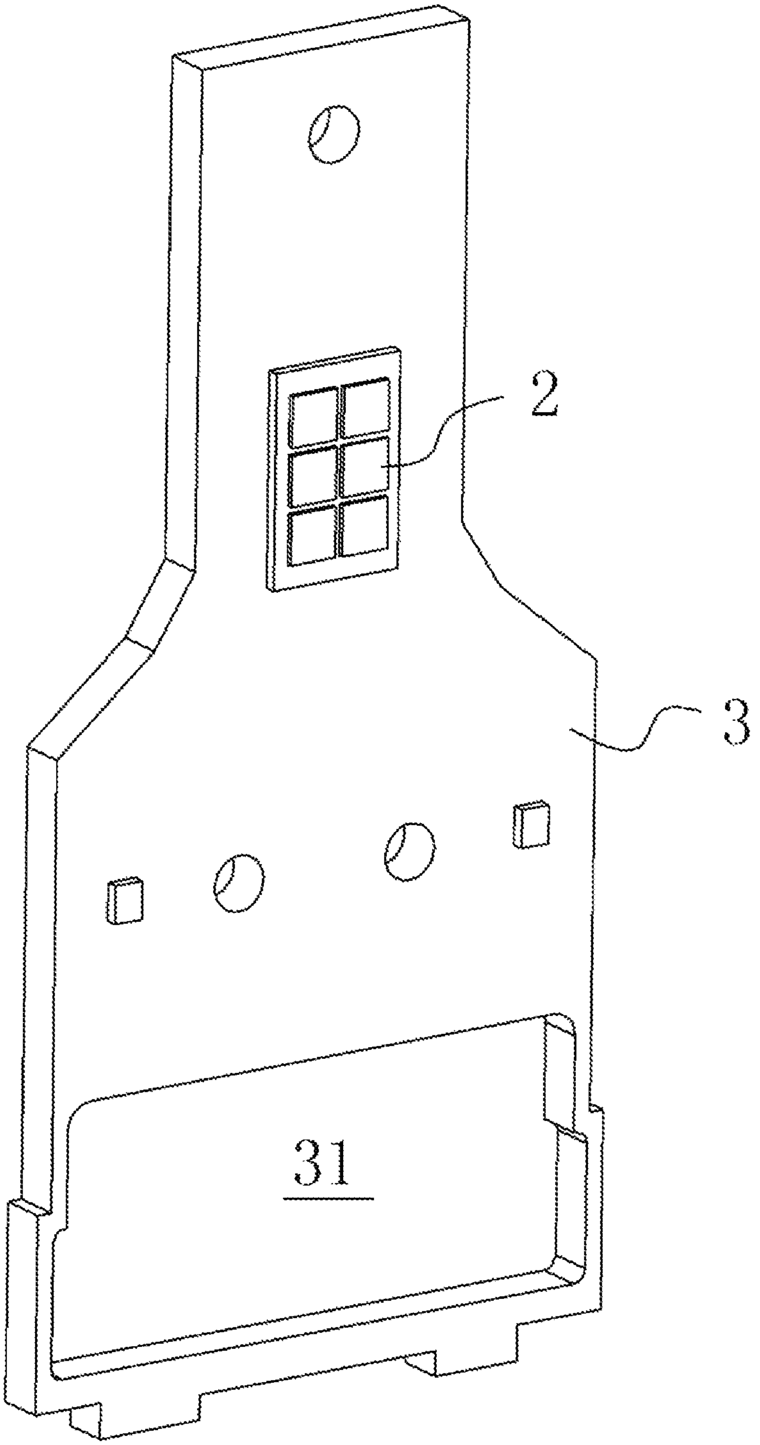
FIG. 8 is a structural diagram of a substrate.
Figure 9:
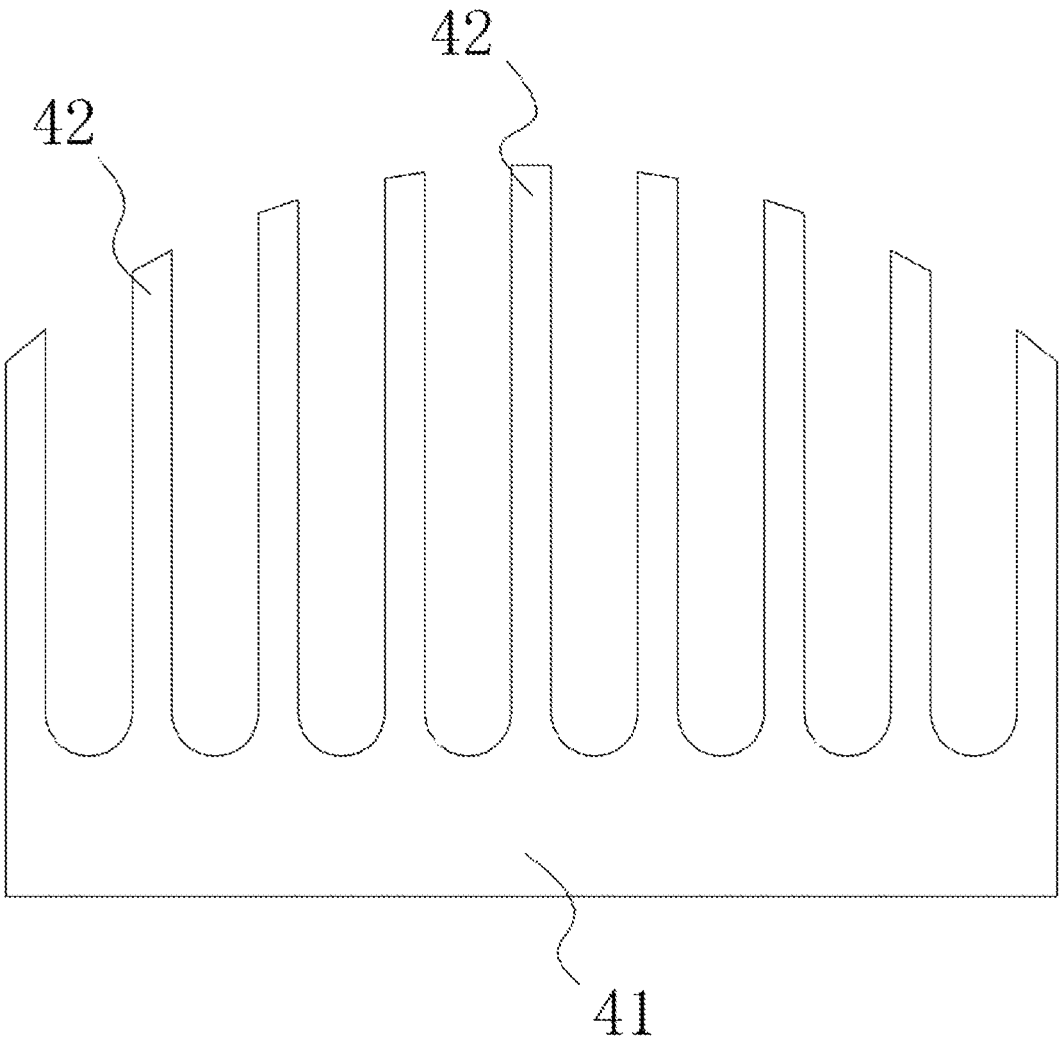
FIG. 9 is a structural diagram of a heat sink.
Figure 10:
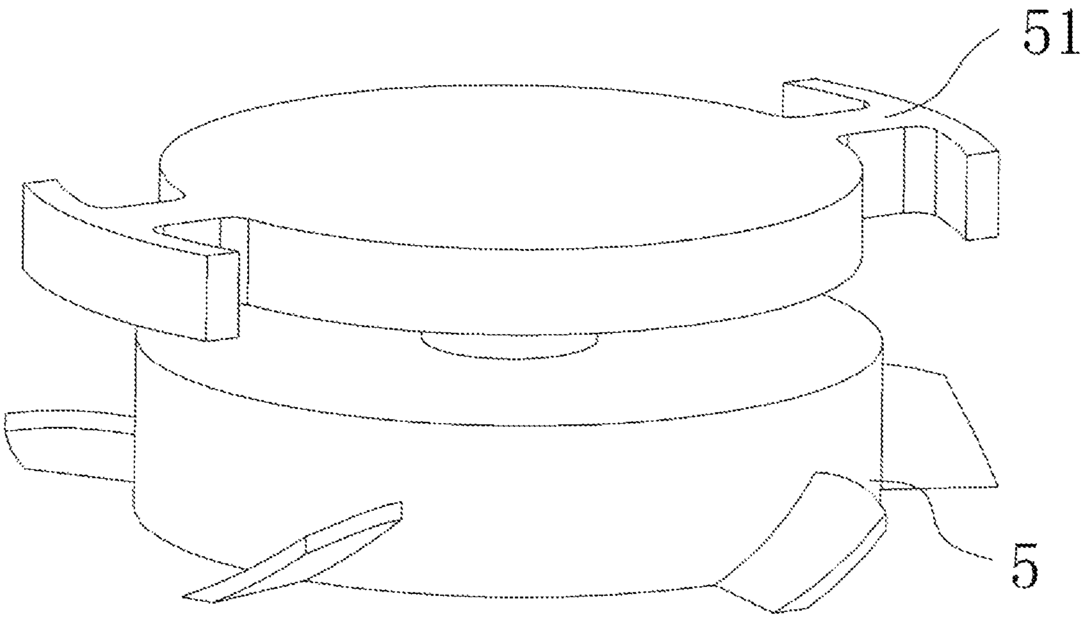
FIG. 10 is a structural diagram of a cooling fan.
Figure 11:
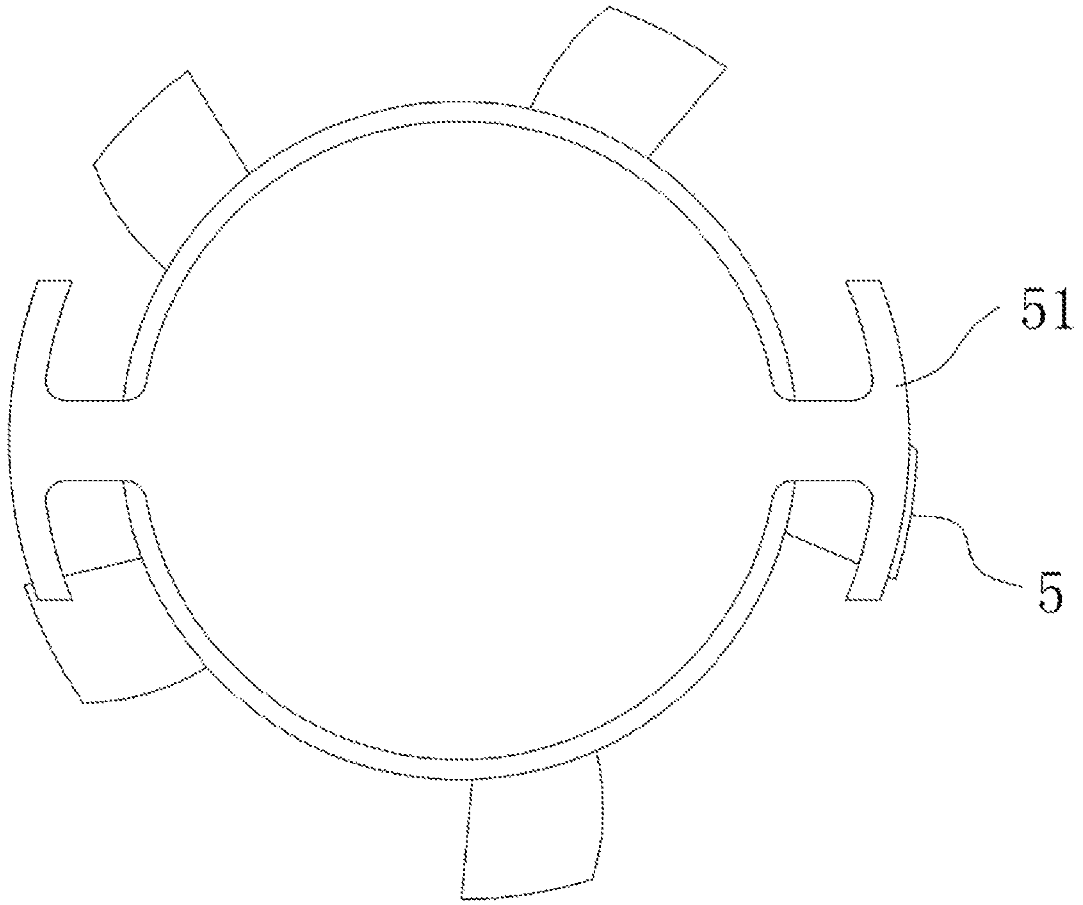
FIG. 11 is a top view of the cooling fan shown in FIG. 11.

As shown in FIGS. 1 to 11, the cooling fan and the substrate provided with the lamp beads are provided inside the housing. The housing is provided with a hole corresponding to and exposing the lamp beads. The heat sink for heat conduction is provided in the heat dissipation slot on the outer wall of the housing and is in contact with the substrate to ensure heat conduction. When the automotive LED headlight is working, the lamp beads emit a large amount of heat. A portion of the heat is retained at the lamp beads, while a portion the heat is conducted to the substrate and then to the heat sink. A small amount of the heat will also be conducted to the housing, causing the lamp beads, the substrate, the heat sink, and the housing to heat up to varying degrees. The cooling fan rotates to form cooling air. The cooling air flows through an inner wall of the housing, the substrate, the heat sink, and the lamp beads to dissipate heat from them The housing 1 can be integrated. Alternatively, as shown in FIGS. 4 to 7, the housing includes two opposite housing parts 10. Opposite sides of the two housing parts are concave. The substrate 3 and the cooling fan 5 are provided between two housing parts for easy component mounting. Along an axial direction, the housing 1 includes sequentially arranged Lamp bead section 13, heat dissipation section 14, and connecting section 15. The cooling fan 5 is provided in the connecting section. The heat dissipation slot is provided in the heat dissipation section. The hole 16 is provided at the straight Lamp bead section and exposes the lamp beads 2. The cooling air can flow smoothly between the heat sink and the lamp beads to cool the components smoothly, further improving the utilization and heat dissipation efficiency of the cooling air. Notch 17 is provided at a side of the heat dissipation slot 12 in the housing 1 facing the lamp beads 2. The cooling air can flow smoothly and centrally between the heat sink and the lamp beads, avoiding a large amount of air loss caused by the obstruction of the housing. A diameter of an inner wall of the connecting section 15 is greater than a diameter of an inner wall of the heat dissipation section 14. The size and airflow of the cooling fan can be increased appropriately to meet the cooling needs. As shown in FIGS. 6, 10, and 11, an inner wall of an end of the heat dissipation section 14 facing away from the lamp beads 2 is provided with fan mounting slot 18. Fan mounting plate 51 is fixedly provided in the fan mounting slot. A rotating shaft of the cooling fan 5 is provided on the fan mounting plate. The layout space inside the housing can be fully and effectively utilized to meet the mounting needs of the heat sink, and the size of the cooling fan can be increased to provide sufficient rotational space.

In the automotive LED headlight structure, the heat sink can be integrated with the housing, and can be for example, made of aluminum. Alternatively, the heat sink can be detachably provided on the housing. The heat sink can be in various shapes such as square, wavy, etc. Alternatively, as shown in FIG. 9, the heat sink includes heat dissipation bottom plate 41 in contact with the substrate 3 and a plurality of cooling fins 42 vertically arranged on an outer side of the heat dissipation bottom plate. Gaps between the cooling fins increase the heat dissipation area, ensuring smooth blowing of the cooling air. Regarding a thickness of the heat dissipation bottom plate, the outer side of the heat dissipation bottom plate 41 can be provided on a plane where a bottom surface of the notch 17 of the heat dissipation slot is located or at a side of the plane facing the substrate 3 to prevent the heat dissipation bottom plate from protruding from the notch and ensure that the cooling air smoothly blows towards the lamp beads.

Figure 3:
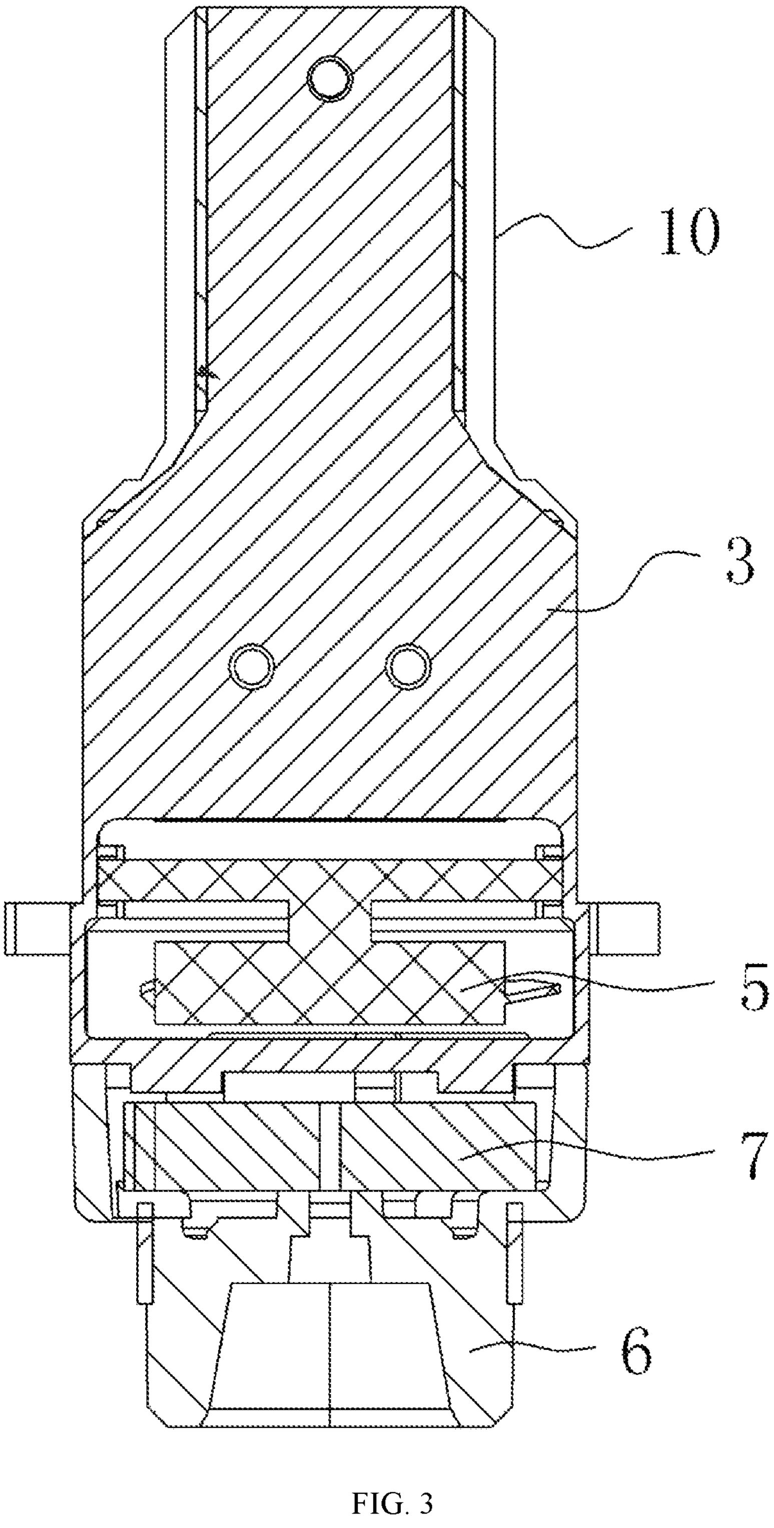
FIG. 3 is a sectional view taken along line A-A of the automotive LED headlight structure shown in FIG. 2.
Figure 4:
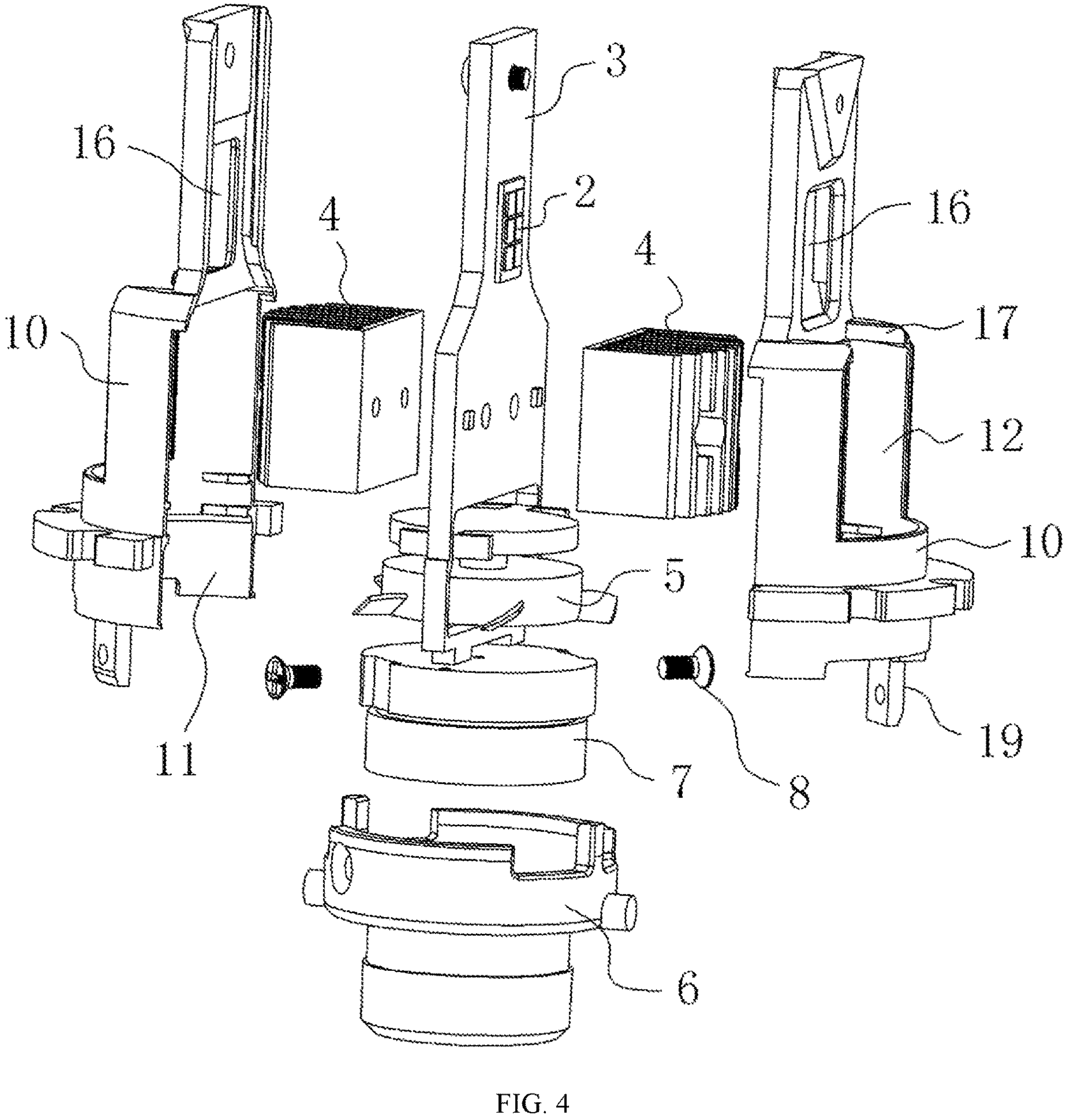
FIG. 4 is an exploded view of the automotive LED headlight structure shown in FIG. 1.
Figure 5:
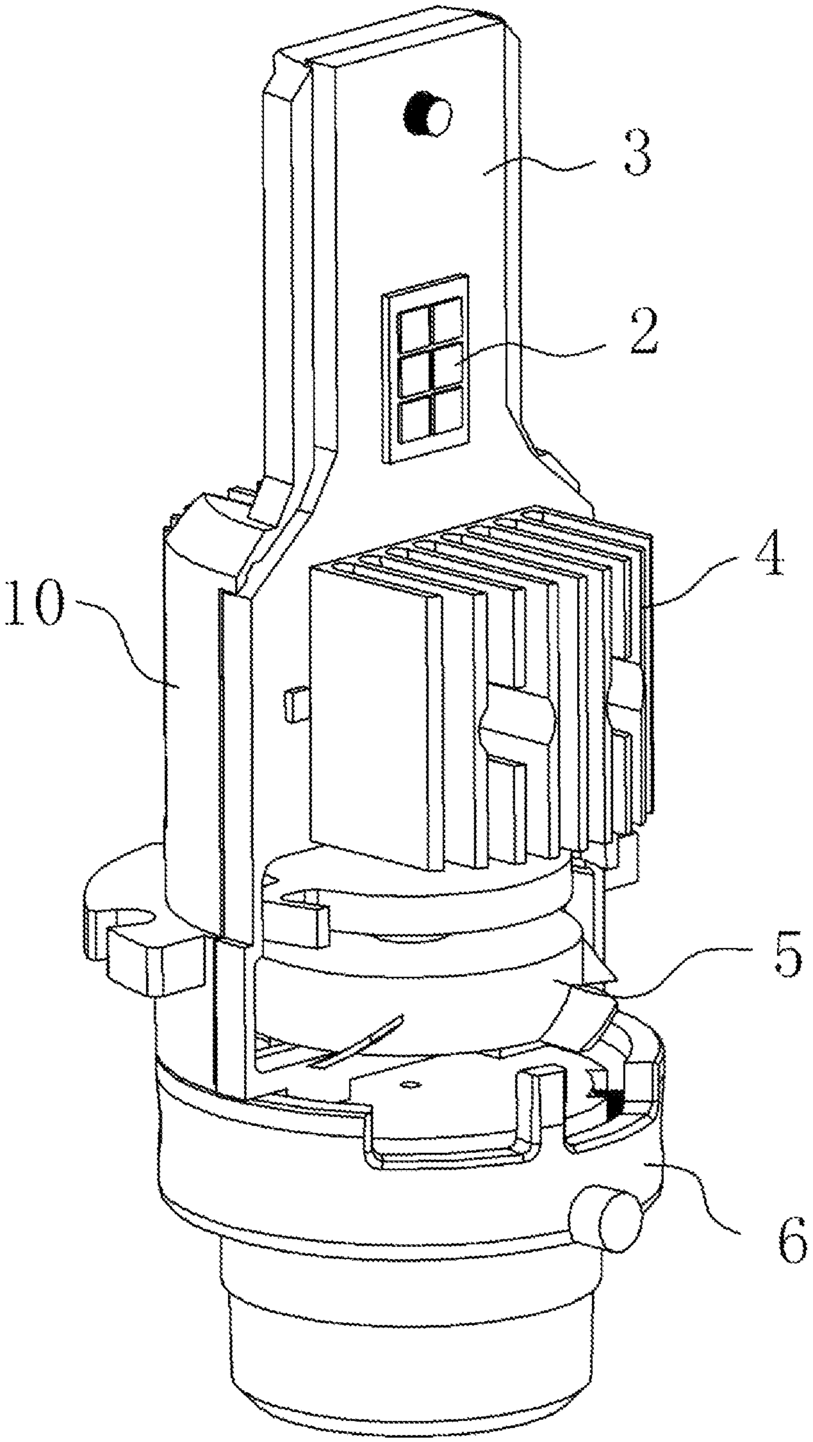
FIG. 5 is a structural diagram of the automotive LED headlight structure with one housing part removed.

As shown in FIGS. 1 to 5, the end of the housing 1 facing away from the lamp beads 2 is provided with adapter 6 for connecting an automotive system. A side of the adapter facing the lamp beads is provided with an opening and an inwardly recessed storage chamber. Circuit board 7 is fixedly provided in the storage chamber. An end of the substrate 3 extends into the storage chamber and is connected to the circuit board to meet a circuit layout requirement. As shown in FIGS. 3, 4, and 8, the substrate 3 is provided with avoidance hole 31 corresponding to the cooling fan 5 and allowing the cooling fan 5 to pass through. The design meet the mounting requirement of the cooling fan and increases the contact area between the cooling air and the substrate to ensure that the cooling air flows through the substrate, thereby improving the heat dissipation efficiency. As shown in FIG. 1, the adapter 6 is provided with ventilation hole 61 communicated with the storage chamber to facilitate the flow of the cooling air. The ventilation hole 61 can be in the form of slot, square, or other shape. An air outlet of the cooling fan 5 can face or face away from the heat sink 4 to generate a corresponding airflow. Preferably, the air outlet faces the heat sink to form effective cooling air to meet the heat dissipation needs of each component. The adapter 6 can be cylindrical in shape to reduce its diameter and volume while meeting mounting requirements. An end of the housing 1 is provided with connecting plate 19. The connecting plate is connected to the adapter 6 through locking screw 8, thereby fixing the adapter and the housing to each other.

The above described are merely preferred embodiments of the present disclosure, which are not intended to limit the scope of the patent of the present disclosure. Any equivalent structure transformation made based on the description and drawings of the present disclosure, or direct or indirect application thereof in other related technical fields, should fall within the protection scope of the patent of the present disclosure.

What is claimed is:

1. An automotive light-emitting diode (LED) headlight structure, comprising:
- a housing,
- a substrate provided inside the housing and provided with lamp beads, and
- a heat sink and a rotatable cooling fan for conducting heat;
- wherein a chamber is provided in the housing, and the cooling fan is provided in the chamber; an outer wall of the housing is provided with a heat dissipation slot between the cooling fan and the lamp beads; and the heat sink is provided in the heat dissipation slot and in contact with the substrate,
- wherein the substrate is provided with an avoidance hole, wherein the avoidance hole corresponds to the cooling fan and allows the cooling fan to pass through.

2. The automotive LED headlight structure according to claim 1, wherein the housing comprises a lamp bead section, a heat dissipation section and a connecting section, wherein the lamp bead section, the heat dissipation section and the connecting section are sequentially arranged; the cooling fan is provided in the connecting section; the heat dissipation slot is provided in the heat dissipation section; and the lamp bead section is straight and provided with a hole for exposing the lamp beads.

3. The automotive LED headlight structure according to claim 2, wherein a diameter of an inner wall of the connecting section is greater than a diameter of an inner wall of the heat dissipation section.

4. The automotive LED headlight structure according to claim 3, wherein a notch is provided at a side of the heat dissipation slot in the housing, wherein the side of the heat dissipation slot in the housing faces the lamp beads.

5. The automotive LED headlight structure according to claim 3, wherein the heat sink comprises a heat dissipation bottom plate in contact with the substrate and a plurality of cooling fins vertically arranged on an outer side of the heat dissipation bottom plate; and the outer side of the heat dissipation bottom plate is provided on a plane where a bottom surface of a notch of the heat dissipation slot is located or at a side of the plane facing the substrate.

6. The automotive LED headlight structure according to claim 3, wherein an air outlet of the cooling fan faces the heat sink.

7. The automotive LED headlight structure according to claim 2, wherein an inner wall of an end of the heat dissipation section facing away from the lamp beads is provided with a fan mounting slot; a fan mounting plate is fixedly provided in the fan mounting slot; and a rotating shaft of the cooling fan is provided on the fan mounting plate.

8. The automotive LED headlight structure according to claim 7, wherein a notch is provided at a side of the heat dissipation slot in the housing, wherein the side of the heat dissipation slot in the housing faces the lamp beads.

9. The automotive LED headlight structure according to claim 7, wherein the heat sink comprises a heat dissipation bottom plate in contact with the substrate and a plurality of cooling fins vertically arranged on an outer side of the heat dissipation bottom plate; and the outer side of the heat dissipation bottom plate is provided on a plane where a bottom surface of a notch of the heat dissipation slot is located or at a side of the plane facing the substrate.

10. The automotive LED headlight structure according to claim 7, wherein an air outlet of the cooling fan faces the heat sink.

11. The automotive LED headlight structure according to claim 2, wherein a notch is provided at a side of the heat dissipation slot in the housing, wherein the side of the heat dissipation slot in the housing faces the lamp beads.

12. The automotive LED headlight structure according to claim 2, wherein the heat sink comprises a heat dissipation bottom plate in contact with the substrate and a plurality of cooling fins vertically arranged on an outer side of the heat dissipation bottom plate; and the outer side of the heat dissipation bottom plate is provided on a plane where a bottom surface of a notch of the heat dissipation slot is located or at a side of the plane facing the substrate.

13. The automotive LED headlight structure according to claim 2, wherein an air outlet of the cooling fan faces the heat sink.

14. The automotive LED headlight structure according to claim 1, wherein a notch is provided at a side of the heat dissipation slot in the housing, wherein the side of the heat dissipation slot in the housing faces the lamp beads.

15. The automotive LED headlight structure according to claim 1, wherein the heat sink comprises a heat dissipation bottom plate in contact with the substrate and a plurality of cooling fins vertically arranged on an outer side of the heat dissipation bottom plate; and the outer side of the heat dissipation bottom plate is provided on a plane where a bottom surface of a notch of the heat dissipation slot is located or at a side of the plane facing the substrate.

16. The automotive LED headlight structure according to claim 1, wherein an end of the housing facing away from the lamp beads is provided with an adapter for connecting an automotive system; a side of the adapter facing the lamp beads is provided with an opening and an inwardly recessed storage chamber; a circuit board is fixedly provided in the inwardly recessed storage chamber; and an end of the substrate extends into the inwardly recessed storage chamber and is connected to the circuit board.

17. The automotive LED headlight structure according to claim 16, wherein the adapter is provided with a ventilation hole communicated with the inwardly recessed storage chamber.

18. The automotive LED headlight structure according to claim 1, wherein an air outlet of the cooling fan faces the heat sink.

* * * * *